Patented Aug. 4, 1936

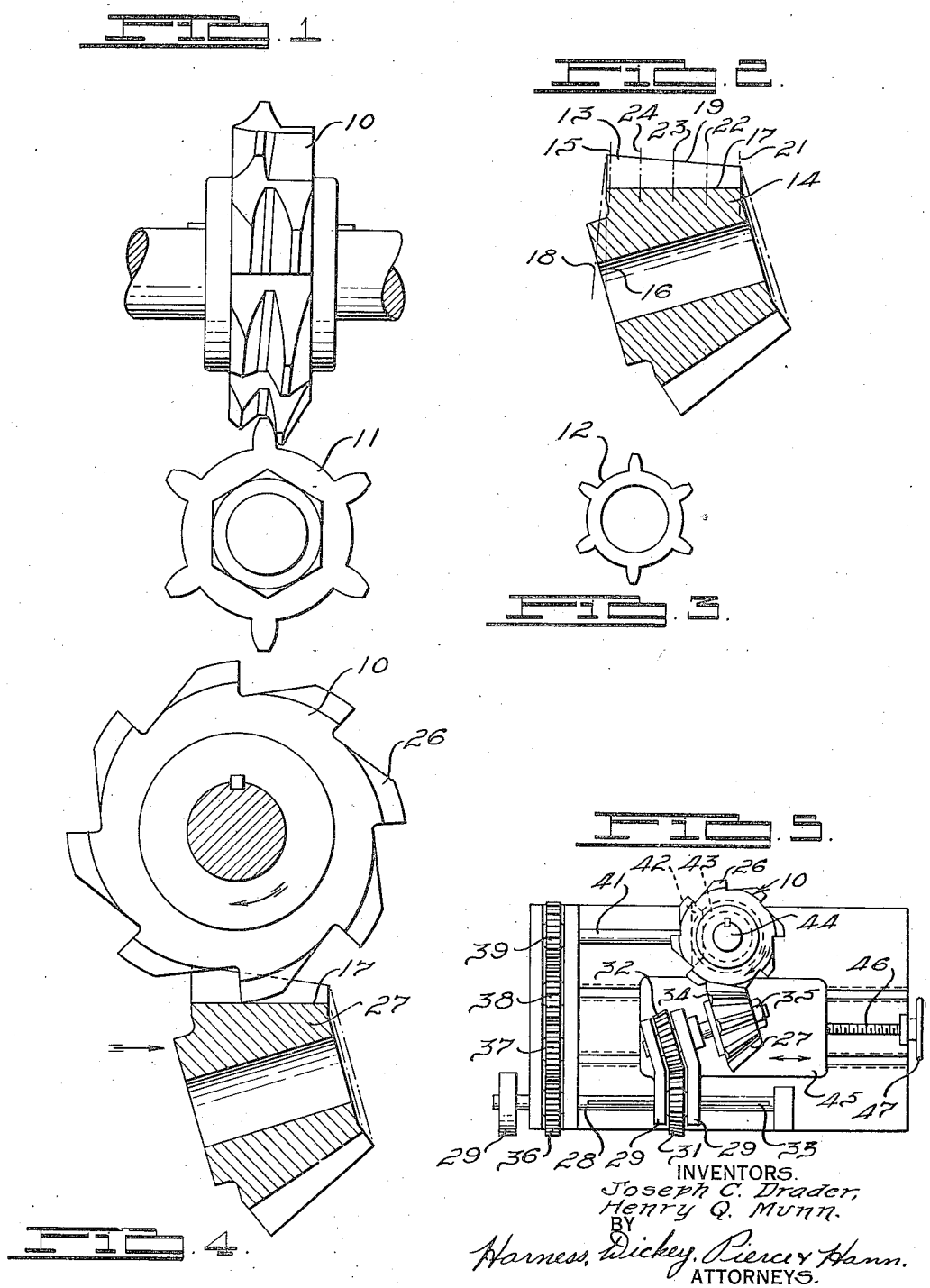

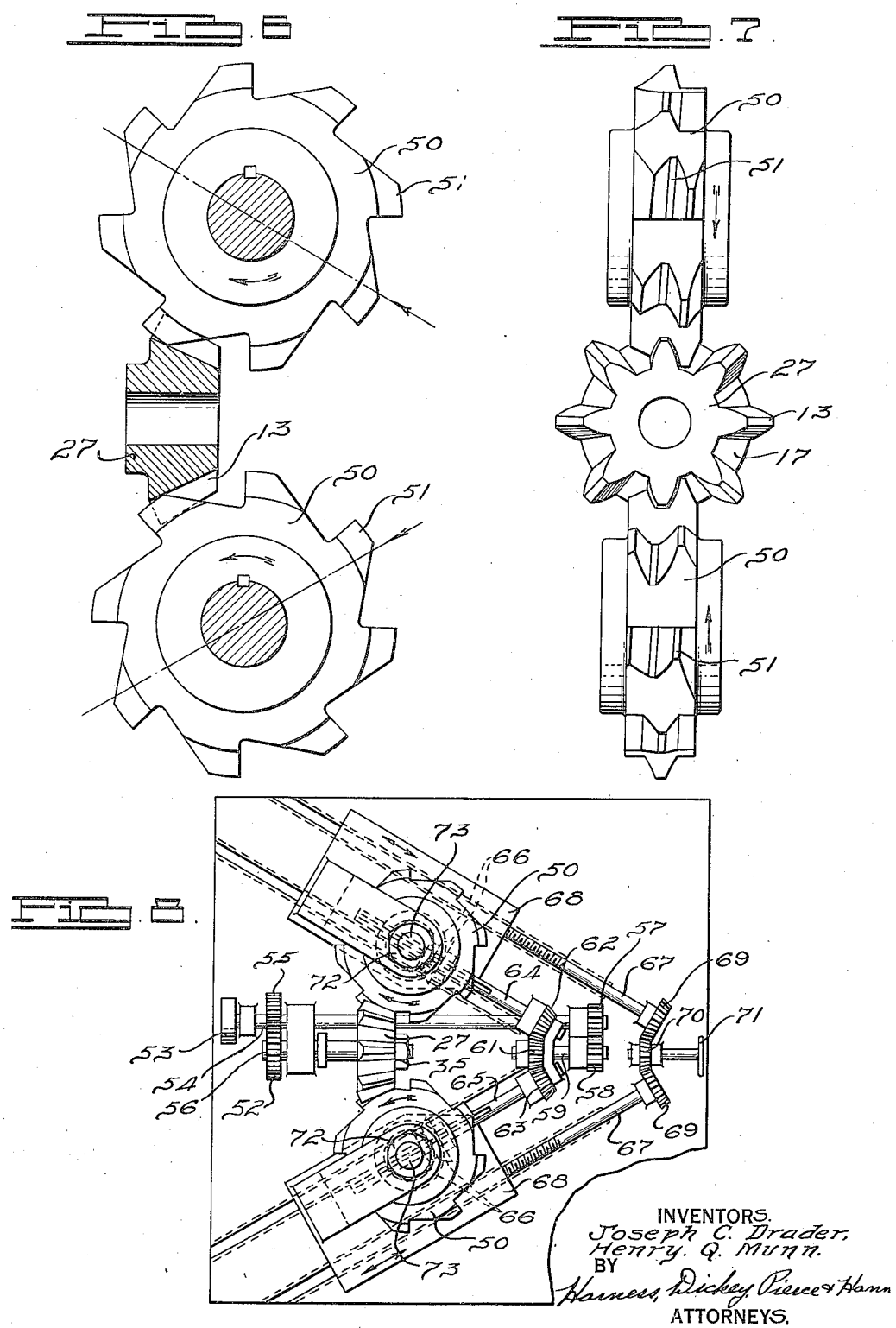

2,049,492

UNITED STATES PATENT OFFICE 2,049,492

METHOD OF MACHINING BEVEL GEARS

Joseph C. Drader and Henry Q. Munn, Detroit, Mich., assignors, by mesne assignments, to Michigan Tool Company, a corporation of Delaware Application December 4, 1933, Serial No. 700,850

1 Claim. (Cl. 90—5)

Our invention relates to bevel gears and particularly to the method of machining bevel gears by a multi-toothed cutting tool.

Difficulty has always been experienced heretofore in machining bevel gears due to the fact that the pitch diameter of the teeth is constantly changing from the front to the rear end of the bevel gear. It has been the practice to machine straight bevel gears by indexing each tooth and passing a cutter thereacross and employ a plate-like cutter for the spiral type of bevel gears.

In practicing the present invention a tool of the hob type is employed having teeth thereon the sides of some of which have a cutting edge which is a composite of some or all of the varying pitch diameter of the bevel gear tooth at various points in its length. The hob is mounted on a rotatable spindle, it being a single position cutting tool, and the gear is mounted to have the root of the teeth disposed normal to the axis of the cutting tool with the axis of the bevel gear at an angle to such normal. The bevel gear and hob are moved relative to each other, parallel to the root of the teeth, during the time they are rotated in synchronism with each other. The cutting of the various pitch diameters on the gear blank is effected because of the change of pitch diameters of the gear blank relative to the cutting teeth of the hob during their relative movement. It will be seen that, although the rotation of the hob and the gear blank is constant relative to each other, the peripheral speed of the gear blank is changing throughout all points of the length of the teeth. This is due to the varying pitch diameter. In the presence of such variation in the peripheral speed of the bevel gear the cutting edges having a composite form will be available to cut the particular form on the teeth corresponding to the pitch diameter of the point. In this manner a true toothed form of varying pitch diameter will be cut on the bevel gear during the single passage of the single position hob thereacross.

Accordingly, the main objects of our invention are to employ a single position cutting tool for machining the teeth on a bevel gear through the single passage of the tool thereacross; to provide a hob having a plurality of teeth thereon, some of which have cutting edges of a composite form of different tooth forms taken at various points along the tooth to be produced thereby; to operate the hob and bevel gear in synchronism with each other during the time they are relatively moved along a plane parallel to the plane of the root of the teeth; to machine a true bevel tooth from the front to the rear of the blank by taking advantage of the progressive change in peripheral speed of the blank during such movement to have the portions of the composite cutting edges shape the tooth at the point corresponding to the varying pitch diameters; and, in general, to provide a method for cutting bevel gears which is simple in operation, which employs a single position tool and which produces accurate bevel gears.

Other objects and features of novelty of our invention will be either specifically pointed out or will become apparent when referring, for a better understanding of our invention, to the following description taken in conjunction with the accompanying drawings, wherein:

Figure 1 is a view in elevation of a cutting tool operating on a bevel gear in accordance with our invention, Fig. 2 is a sectional view of a bevel gear to be cut by our method, Fig. 3 is a plan view of a cutting tool employed to form a portion of the teeth of the tool illustrated in Fig. 1, Fig. 4 is a sectional view of a bevel gear being operated on by our cutting tool, Fig. 5 is a diagrammatic view of a machine disclosing the method of operation of the tool on the blank, Fig. 6 is a further method of machining a bevel gear blank which embodies the method of our invention, Fig. 7 is an end view of the structure illustrated in Fig. 6, and Fig. 8 is a diagrammatic view of a machine employed to operate the tool and work blank illustrated in Figs. 6 and 7.

In our copending application, Serial No. 693,228, filed October 6, 1933, and assigned to the assignee of the present invention, we have described and claimed the hob as a cutting tool, employed to produce bevel gears in accordance with the present method. The hob 10 is machined by a plurality of cutting tools 11 and 12, the profile of the cutting edges of which correspond to that at various points along a tooth 13 of a bevel gear 14, illustrated in Fig. 2. The root diameter at the point 15 on the bevel gear 14 is selected for the cutter 11, the radius of which is indicated by the line 16 normal to the root 17 of the teeth of the bevel gear. The cutter 11 has a root diameter, the radius of which is indicated by the line 18, being a line perpendicular to the crown 19 of the tooth 13 of the bevel gear. The hob 10 is cut in the ordinary manner by the cutter 11, both being operated in synchronism with each other during the passage of the cutter across the hob.

In Fig. 3, we have illustrated a cutter 12 which represents the cutter corresponding to the root diameter at the section 21 of the hob 14 illustrated in Fig. 2 which may alone be employed with the hob 11 when only a rough form of bevel gear is desired. When accurate bevel gears are to be machined, more cutters are employed selected at points indicated by the lines 22, 23, and 24 on the gear of Fig. 2. The various cutters are employed subsequently to each other, preferably relative to the sizes, resulting in some of the teeth being further cut in the shape of the form of the cutters at the various sections 21, 22, 23, and 24. This is effected due to the change in peripheral speeds of the cutters when the cutters are mounted on the shaft on which the cutter 11 is mounted and moved toward the hob 10 in accordance with the change of pitch diameter of the tooth. The tooth is mounted on the centerline of the hob adjacent to the female tooth cut in the hob blank by the cutter 11 and spaced from both sides thereof so that it will not deform such teeth cut by the cutter 11. However, due to the change in the peripheral speed of the cutter, the teeth will lag relative to the advance of the hob teeth until they cut certain amounts from some of the teeth of the hob. After all of the cutters have been employed, some of the teeth of the hob will have a composite form of all of the teeth of the cutters.

After such hob is formed it is only necessary to pass the hob across the surface of the blank of the bevel gear to produce teeth thereon. In Figs. 4 and 5, we have illustrated the employment of a single hob 10, the teeth 26 thereof being radially relieved, that is to say, the shape of the teeth are retained throughout but are shortened radially so that relief is provided to the cutting edge, and the tooth form is maintained as the front cutting edge is machined away during a sharpening operation. The hob 10 and the blank 27 to be machined are mounted on arbors in the same manner as the cutter 11 was mounted relative to the hob 10 cut thereby. A relative movement is provided between the bevel gear 27 and the cutter 10 in a plane parallel to the root 17 of the gear so that the various peripheral speeds will be present during the passage of the gear and cutter blank relative to each other so that at such points the portion of the composite tooth of the cutter representing the profile at that point will be available to machine that form on the tooth of the bevel gear. In this manner a true bevel gear tooth is machined throughout the blank during a single passage of the cutter 10 relative to the blank 27 in a path parallel to the root of the tooth.

In Fig. 5, we have illustrated diagrammatically a machine with the cutter 10 and the blank 27 rotated in synchronism with each other during the time a relative movement is provided between the cutter and blank 27. A shaft 28 is driven through a pulley 29 to operate a bevel gear 31 which is mounted in mesh with a bevel gear 32 both of which are carried along by supporting brackets 29. The gears are driven by means of a key (not shown) which meshes with a splineway 33 provided in the shaft 28. The gear 32 drives a spindle 34 upon which the bevel gear blank 27 is retained by a nut 35. The bevel gear usually is provided with a splineway which mates with a key on the spindle 34 and is retained in fixed relation relative thereto. A gear 36 is likewise driven by the shaft 28 which operates through gears 37 and 38 to drive a gear 39 which is secured to a shaft 41 which drives a bevel gear 42 mated with a bevel gear 43 which drives the arbor 44 upon which the cutter 10 is mounted. The gears 32 and brackets 29 are mounted on a table 45 which is driven by a lead-screw 46 by means of a hand wheel 47, although we preferably drive the table automatically by means well known in the art. In this manner it is only necessary to secure a blank on the spindle 34 and operate the machine to have the hob 10 rotate in synchronism with the rotation of the gear blank 27 during the time the table 45 is moved relative to the cutter 10 to completely cut a bevel gear from the blank. This operation is exceedingly fast and surprisingly accurate and is a considerable advance in the art in the method of machining bevel gears.

As a further extension of our invention we have illustrated in Figs. 6, 7, and 8, a method wherein two cutters 50 are employed which are similar to each other but which have the teeth 51 thereof sidewardly relieved rather than relieved radially as illustrated on the cutter 10 of Fig. 4. In this manner the width of the tooth is reduced relative to the front cutting edge but the side form retained throughout the length of the tooth. However, the disadvantage of this construction resides in the fact that the machining of the front cutting edges of the teeth 51 to sharpen the edges results in the tooth 51 being of less width than the actual slot to be cut between the teeth of the blank as a result of which the bevel gear teeth 13 will be of greater width than desired. To overcome this objectional feature we have employed two of the cutters 50 mounted in such manner that one cutter cuts on one side of a tooth during the time the other cutter cuts on the opposite side of a tooth which provides a further advantage of balancing the torque on the arbor supporting the bevel gear blank 27. The cutters are driven in synchronism with each other and with the rotation of the bevel gear 27, and are moved on diverging axes which form an angle equal to the angle between the roots 17 of the bevel gear. In this manner the cutters are moved parallel to the root of the teeth and the changing pitch diameters of the blank are present in the same manner as in the construction illustrated in Figs. 4 and 5 heretofore explained.

In Fig. 8, we have illustrated diagrammatically a machine for driving the gear and cutters in synchronism with each other during the time they are relatively moved across the face of the blank. A pulley 53 drives a shaft 54 upon which a gear 55 is mounted for driving a gear 52 secured to the spindle 56 which supports the gear blank 27. The gear blank is retained on the spindle 56 by the nut 35 as above explained. The shaft 54 also drives a gear 57 which in turn drives a gear 58 and a shaft 59 upon which a bevel gear 61 is mounted. The bevel gear 61 is mated with gears 62 and 63 which drive shafts 64 and 65 to operate through a set of bevel gears 66 to drive the cutters 50 in timed relation to each other and to the rotation of the gear blank 27. Lead screws 67 engage the carriages 68 upon which the cutters 50 are mounted and are driven through gears 69 by a gear 70 which may be operated through the driving means of the machine to advance the cutters a predetermined rate across the blank.

We have illustrated a hand wheel 71 for effecting the operation in the diagrammatic showing.

To relatively move the gear blank and the cutters after a sharpening operation, we have illustrated nuts 72 on shafts 73 which support the gears 50 through the adjustment of which the cutters are shifted toward the gear blank 27 after the cutters have been sharpened. This shift is made an amount equal to half the reduction of the width of the teeth due to the sharpening operation and in this manner a true tooth form is cut on the bevel gear irrespective of the reduction in width of the teeth on the cutting tools 50 due to the sharpening operation. The gear blank can be moved relative to the cutters, but we prefer to adjust the cutters since the sharpening operation may have changed the tooth width disproportionate amounts.

In this manner, the teeth on the bevel gear 27 are accurately and rapidly machined during one passage of the cutters thereacross after which the bevel gear is removed, the cutters returned to their original position and a new gear blank secured to the shaft and the operation repeated.

While we have described and illustrated but two embodiments of our invention, it will be apparent to those skilled in the art that various changes, omissions, additions and substitutions may be made therein without departing from the spirit and scope of our invention, as set forth in the accompanying claim.

We claim as our invention:

The method of machining bevel gears utilizing a cutting tool having a plurality of teeth congruent in form to the teeth to be cut and disposed in an overlapping spiral row, said respective teeth having cutting edges which vary progressively in form in accordance with the variation in pitch diameter of the blank from one end thereof to the other which comprises: mounting said cutting tool and a blank in positions fixed against relative bodily movement except in a direction axially of the blank, rotating the tool and blank in synchronism with each other, one face of a tooth of said blank being planed by a cutting edge in one overlapped part of said spiral and the other face of said blank tooth being simultaneously planed by a cutting edge in the other overlapped part of said spiral, and advancing the blank and tool relative to each other in a plane parallel to the root of the teeth to be cut to cause the position of the tool cutting edges relative to the teeth of the blank to change in accordance with the change in peripheral speed of the blank, to thereby cause the tool to cut said blank teeth to correct form and pitch.

JOSEPH C. DRADER.
HENRY Q. MUNN.